Patented Mar. 26, 1929.

1,706,902

UNITED STATES PATENT OFFICE.

MAXIMILIAN PAUL SCHMIDT AND OTTO LIMPACH, OF BIEBRICH-ON-THE-RHINE, GERMANY, ASSIGNORS, BY MESNE ASSIGNMENTS, TO GRASSELLI DYESTUFF CORPORATION, OF NEW YORK, N. Y., A CORPORATION OF DELAWARE.

VAT DYESTUFF AND PROCESS OF MAKING SAME.

No Drawing. Application filed November 17, 1925, Serial No. 69,704. Renewed February 12, 1929.

The present invention relates to new vat dyestuffs and a process of preparing the same; more particularly it relates to the dyestuffs of the general formula:

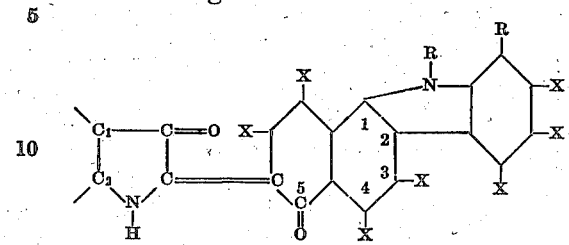

wherein X represents hydrogen or a monovalent substituent, at least one R represents an alkyl group, the other R stands for alkyl or hydrogen, $C_1$ and $C_2$ being carbon atoms belonging to a benzene or naphthalene nucleus which may be substituted.

Our dyestuffs are obtainable by condensing a reactive isatin-2-derivative with a compound of the following general formula:

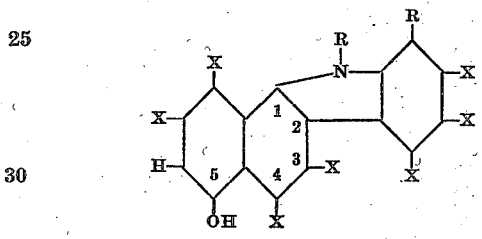

wherein X represents hydrogen or a monovalent substituent and at least one R stands for an alkyl group, the other R being alkyl or hydrogen.

Our new dyestuffs yield on wool and cotton dyeings of excellent fastness and, as regards their properties, are much superior to the hitherto known dyestuffs of this kind obtainable from phenohydroxynaphthocarbazoles and isatin-2-derivatives. Thus, the dyestuff obtainable from ortho-toluhydroxynaphthocarbazole and isatin-2-anilide gives a beautiful bloomy black tint, the purity of which can be enhanced by boiling in an acidified bath. The corresponding dyestuff produced from chlorisatin-2-anilide gives on cotton dyeings of perfect fastness. Dyeings of similar fastness and shades are obtainable by means of the dyestuffs produced from carbazoles alkylated at the nitrogen atom.

The following examples serve to illustrate our invention the parts being by weight:

1. 22 parts of isatin-2-anilide and 27,7 parts of ortho-tolu-5-hydroxynaphthocarbazole are heated with 400 parts of acetic anhydride until the isatin-2-anilide has disappeared. After cooling the crystalline dyestuff is filtered off and washed with alcohol. The dyestuff so obtained forms a black crystalline powder which dissolves in concentrated sulfuric acid to a bluish-black color. With an alkaline hydrosulfite a yellow vat is obtained dyeing wool and cotton on exposure to the air black tints. The dyestuff has the most probable formula:

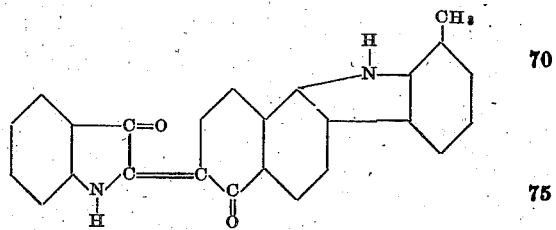

2. 24,7 parts of ortho-tolu-5-hydroxynaphthocarbazole are heated to boiling for some hours with 29 parts of 5-chlorisatin-2-parachloranilide. The dyestuff is worked up as indicated in Example 1. It forms a black powder which dissolves in concentrated sulfuric acid to a bluish-black solution. From an alkaline vat the dyestuff dyes wool and cotton black tints. The dyestuff has the most probable formula:

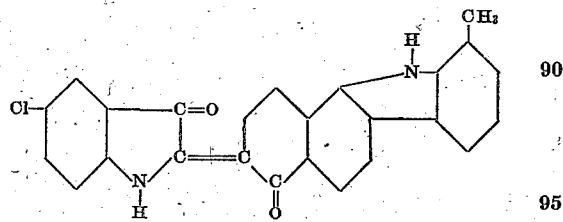

Similar dyestuffs, which are distinguished by a somewhat greater fastness to chlorine, are obtained by condensing with isatin-2-derivatives the pheno-5-hydroxynaphthocarbazoles which are methylated at the nitrogen atom.

By the term "isatin-2-derivatives" I understand in the foregoing description and in the following claims compounds which contain in 2-position of the nucleus containing nitrogen exchangeable groups and in which the ring attached to the 5-ring may be a substituted or unsubstituted benzene- or naphthalene nucleus.

We claim:

1. As new products the dyestuffs of the following general formula:

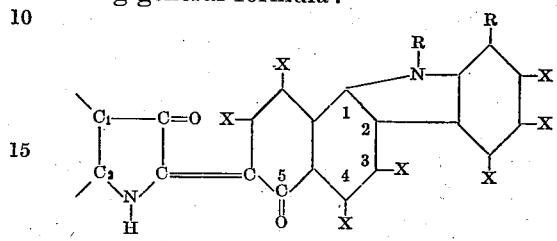

wherein X represents hydrogen or a monovalent substituent, at least one R stands for alkyl, the other R for alkyl or hydrogen, and $C_1$ and $C_2$ represent carbon atoms belonging to a benzene or naphthalene nucleus which may be substituted, said dyestuffs forming black powders dissolving in concentrated sulfuric acid to bluish-black solutions and dyeing wool and cotton from an alkaline vat on exposure to air black tints.

2. As new products the dyestuffs of the following general formula:

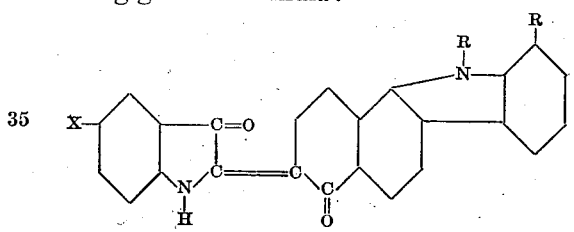

wherein X represents hydrogen or chlorine, one R represents methyl, the other R hydrogen, said dyestuffs forming black powders dissolving in concentrated sulfuric acid to bluish-black solutions and dyeing wool and cotton from an alkaline vat on exposure to air black tints.

3. As a new product the dyestuffs of the following general formula:

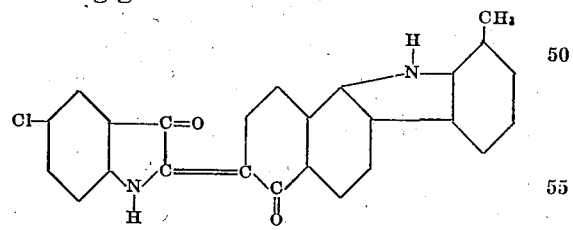

forming a black powder dissolving in concentrated sulfuric acid to a bluish-black solution and dyeing wool and cotton black tints from an alkaline vat on exposure to air.

4. The process which comprises condensing an isatin-2-derivative with a compound of the general formula:

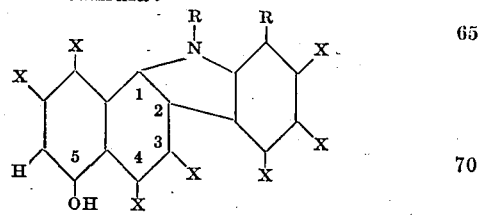

wherein X represents hydrogen or a monovalent substituent, at least one R stands for an alkyl group, and the other R being hydrogen or alkyl.

In testimony whereof we hereunto affix our signatures.

Dr. MAXIMILIAN PAUL SCHMIDT.
Dr. OTTO LIMPACH.